UNITED STATES PATENT OFFICE.

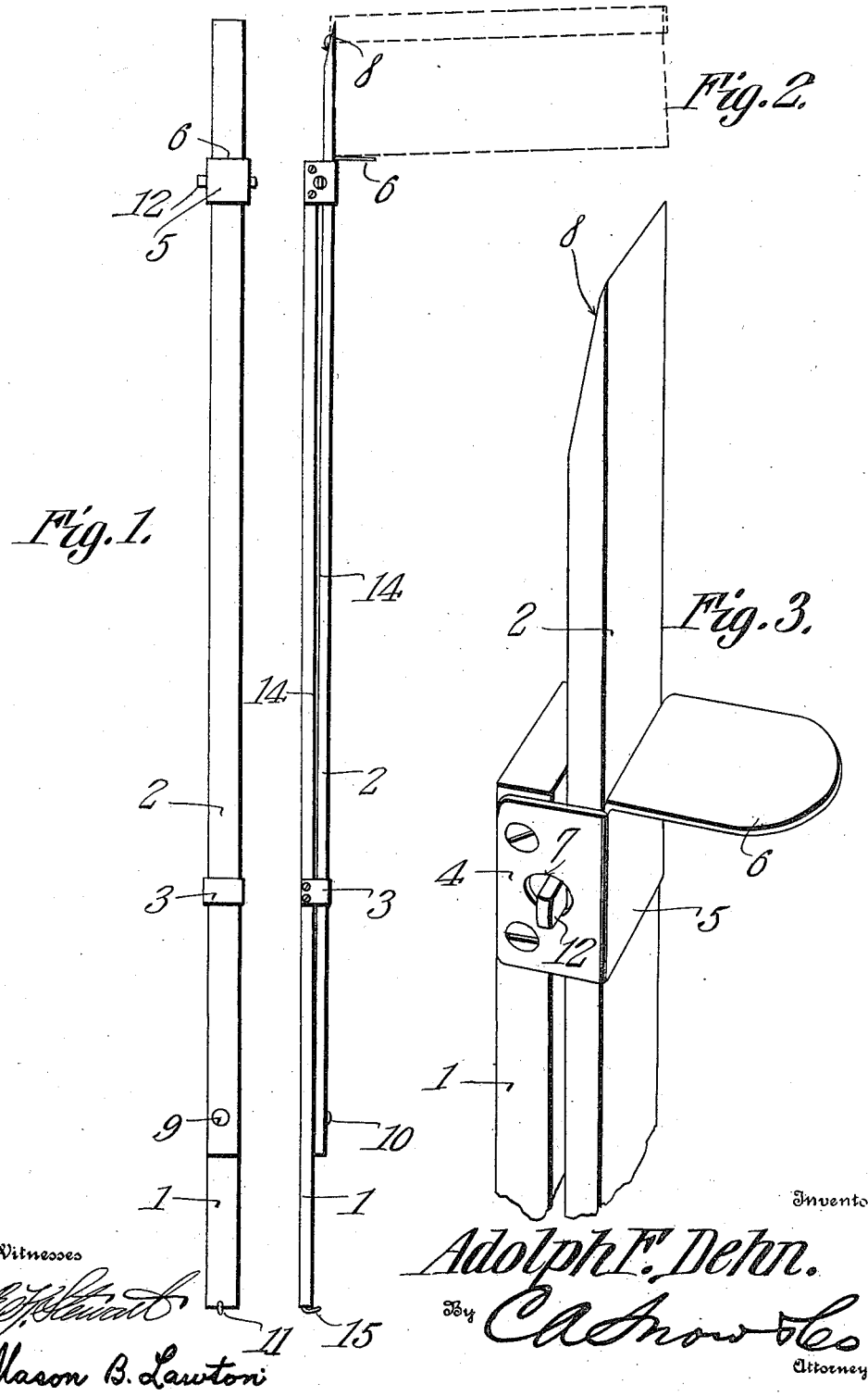

ADOLPH F. DEHN, OF WILLIAMSBURG, KANSAS.

BOX-LIFTER.

964,090. Specification of Letters Patent. Patented July 12, 1910.

Application filed July 6, 1909. Serial No. 506,167.

*To all whom it may concern:*

Be it known that I, ADOLPH F. DEHN, a citizen of the United States, residing at Williamsburg, in the county of Franklin and State of Kansas, have invented a new and useful Box-Lifter, of which the following is a specification.

The objects of the invention, are generally, the provision in a merchantable form of a device above described, which shall be inexpensive to manufacture, facile in operation, and devoid of complicated parts; specifically the provision in a box lid lifter comprising a fixed and a movable member, of a bracket of novel and improved construction to serve as a support upon which the box is adapted to rest, the said bracket serving as a guide whereby the movable member is slidably assembled with the fixed member; the provision of novel means whereby the movable member may be engaged for operation; and the provision of novel means for limiting the movement of the movable member in respect to the fixed member; other and further objects being made manifest hereinafter as the description of the invention progresses.

The invention consists in the novel construction and arrangement of parts to be hereinafter described, delineated in the accompanying drawings, and particularly pointed out in that portion of this instrument wherein patentable novelty is claimed for certain peculiar and distinctive features of the device, it being understood, that, within the scope of what hereinafter thus is claimed, divers changes in the form, proportions, size, and minor details of the structure may be made, without departing from the spirit or sacrificing any of the advantages of the invention.

Similar numerals of reference are employed to denote corresponding parts throughout the several figures of the drawings.

In the accompanying drawings, Figure 1 is a front elevation; Fig. 2 is a side elevation; Fig. 3 is a fragmental perspective upon an enlarged scale.

In carrying out my invention, I provide, generally, a fixed member 1 and a movable member 2 which is adapted to slide thereon, the said members being substantially coextensive in length and breadth. Intermediate its ends, and relatively near its lower end, the fixed member 1 is provided with a U-shaped guide 3 arranged to inclose the movable member 2 and to retain the same against lateral displacement from the fixed member.

Mounted upon the fixed member 1, adjacent its upper end, is a bracket adapted to support the box while it is being lifted or lowered, the bracket forming a guide having the function hereinbefore ascribed to the member 3. This bracket is, broadly speaking, U-shaped, the arms 5 thereof at their extremities being assembled with the edges of the fixed member 1. The intermediate portion 5 of the bracket is provided upon its upper edge, with a foot 6 adapted to outstand beyond the movable member 2, the foot 6 constituting the element upon which the box is immediately supported.

The upper extremity of the movable member 2 is beveled as denoted by the numeral 8, upon its rear face, to give to the movable member 2 a wedge-shape at its upper extremity, whereby the same may readily be inserted between the flange of the box cover and the body of the box. Adjacent its lower end, the movable member 2 is provided with an outstanding stud 9 upwardly spaced from the lower extremity of movable member 2. The outer face of the stud 9 is inclined downwardly, and inwardly toward the movable member 2 to form a suitable abutment to receive the thumb of the operator in the adjustment of the movable member 2, the space intervening between the stud 9 and the lower extremity of the movable member 2 being adapted to receive the ball of the thumb of the operator, so that the thumb cannot come into contact with the fixed member 1, during the adjustment of the movable member 2. The inclined face 10 of the stud 9, may, if desired, be round, so that said stud, while offering a firm hold for the thumb of the operator, will not injure the member.

Mounted in the lower end of the fixed member 1 is a stop 11 having an arm 15 arranged to extend outwardly beneath the lower extremity of the movable member 2 to receive the same, to limit the downward movement of the movable member. This arm 15 is upwardly inclined, to reinforce the stop and to prevent the same from being bent by contact with the movable member 2. Owing to the upward inclination given to the arm 15 of the stop, the same is adapted to serve as a hook whereby the device may be suspended from a support when not in use.

The arms 4 of the bracket are provided with openings 7 alined with the adjacent faces 14 of the members 1 and 2. Through either of these openings 7 may be inserted a splinter of wood or a small wedge 12, adapted to engage the adjacent faces 14 of the members 1 and 2, whereby the movable member 2 may be held in a predetermined position with respect to the fixed member 1.

The operation of the device will probably be understood from the foregoing description, but it may be stated briefly, that, the extremity of the beveled end face of the movable member being spaced at the required distance of the foot 6 of the bracket, the beveled portion 8 of the movable member may be introduced between the cover of the box and the body thereof, the foot 6 being made to engage the bottom of the box. When the box is thus mounted upon the device of my invention, the box may readily be lifted from or placed upon a high shelf beyond the reach of the arm of the operator. When the boxes which are to be moved are of the same dimensions, so that a frequent adjustment of the movable member is unnecessary, the movable member may be held in place with respect to the fixed member by means of the wedge 12 which is introduced through the opening in the bracket, as hereinbefore described.

Having thus described my said invention, what I claim as new and desire to protect by Letters Patent is:—

A device of the class described comprising a fixed member; a movable member arranged to slide upon the fixed member; a guide assembled with the fixed member and arranged to inclose the movable member, the guide being provided with an aperture alined with the adjacent faces of the members and with an outstanding foot; and an element adapted to be terminally inserted in the aperture in the guide to engage the adjacent faces of the members simultaneously.

In testimony that I claim the foregoing as my own, I have hereto affixed my signature in the presence of two witnesses.

ADOLPH F. DEHN.

Witnesses:
  W. M. DEVORE,
  G. K. JANES.